May 21, 1929.  T. G. McDOUGAL  1,713,852
TUNNEL KILN CONSTRUCTION
Filed July 30, 1927
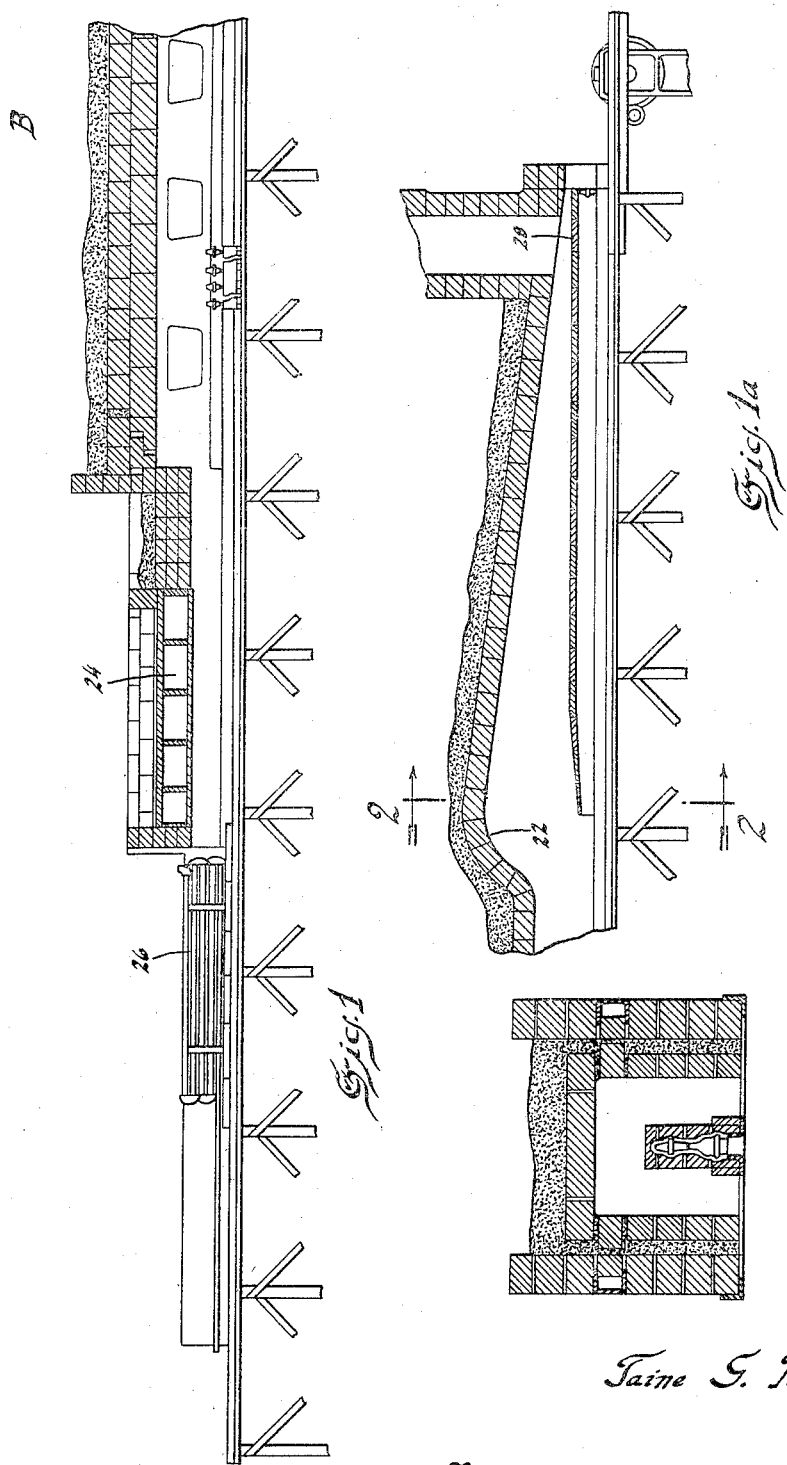

Patented May 21, 1929.

1,713,852

UNITED STATES PATENT OFFICE.

TAINE G. McDOUGAL, OF FLINT, MICHIGAN, ASSIGNOR TO A C SPARK PLUG COMPANY, OF FLINT, MICHIGAN, A CORPORATION OF MICHIGAN.

TUNNEL-KILN CONSTRUCTION.

Application filed July 30, 1927. Serial No. 209,456.

This invention relates to a method of heat treatment which may be used in various industrial processes, such as the baking of ceramic materials, and enameled articles and in the heat treatment of various metals. The disclosure in the present case relates particularly to the treatment of ceramic articles.

A tunnel kiln is used in carrying out the process referred to. A continual train of wares to be heat-treated is passed through this tunnel, in either a continuous or an interrupted progression. Openings are provided in the central portion of the tunnel for the introduction of the gaseous or liquid fuel and it is in this part of the tunnel that combustion takes place. The central part of the tunnel is hereinafter referred to as the high temperature zone. The heated gases resulting from the combustion are passed out toward the end of the tunnel into which the wares to be treated enter. As the entering wares gradually heat as they pass toward the high temperature zone and as the heated gases cool as they come in contact with the gradually heating wares, it is obvious that the preheating zone of the tunnel is progressively lower in temperature from the central high temperature zone to the point where the heated gases pass out of the tunnel.

In the heat treating of ceramic materials, it is highly important that the heating be gradual. Sudden or non-uniform heating may cause cracking or warping of the wares, thus producing an inferior or a valueless product. In a kiln wherein the wares contact directly with the current of heated gases from the high temperature zone, the heating of the wares is not as uniform as could be desired. The currents of the heated gases are uneven in temperature, due to slight variations in the supply of fuel and air and in the draft.

It is an object of this present invention to gradually and uniformly heat the entering train of wares. I accomplish this by providing a muffle of refractory material in the preheating section of the tunnel, so that a portion of the heat from the escaping heated gases must be conducted through the muffle to the wares. As the muffle must necessarily change in temperature very slowly, the wares become heated at a uniform rate by radiation from the inner walls of the muffle.

It is a further object of my invention to make allowance for the different qualities of different ceramic materials by providing means whereby a portion of the escaping heated gases can be passed directly through the muffle if desired.

Other objects and advantages of the invention will appear in the course of the following description, taken in connection with the accompanying drawing and appended claims.

In the drawing:

Figures 1 and 1ª are complementary longitudinal views of my improved tunnel kiln, portions of the tunnel being formed in section. The figures show complementary sections of the same tunnel.

Figure 2 is a section on the line 2—2 of Figure 1ª. The passage through the muffle is so shaped that there is some clearance between the walls and the ware at the entrance. The passage converges toward the inner end of the muffle, however, and there the clearance between the ware and the inner walls of the tunnel is as little as possible in order that a minimum amount of the heated gases may enter the muffle.

The tunnel is arched at the juncture of the high temperature and preheating zones, as illustrated at 22. This added clearance permits the escaping heated gases to pass through the space surrounding the muffle instead of through the muffle itself.

The structure and conformation of the high temperature zone B and the cooling zone C is the same as that described in my copending application Serial No. 75,046 filed December 12th, 1925, and reference may be had thereto for further details. It is deemed sufficient for the purposes of the present application to state that after heating in the high temperature zone B, the wares pass through the indirectly air-cooled section 24 and the indirectly water-cooled section 26 and thence out of the tunnel in the usual manner.

The drafts may be controlled and varied in any desired manner. In case it is desired to pass a current of the heated gases through the muffle, one or more of the top plates 28 may be removed.

The structure described gives a uniform application of heat to the wares. During operation, the muffle becomes heated from the hot gases coming from the high temperature zone and heat is radiated to the wares. The heating is gradual due to the fact that the ware is spaced farther from the inner walls of the muffle at the entering end than it is at the end adjacent the high temperature zone and due also to the fact that the temperature of the muffle is progressively lower from the high temperature zone toward the entering end. The muffle protects the wares from the uncertain drafts and currents of the heated gases and radiates heat at a uniform rate to the wares.

I claim:

1. In a tunnel kiln, a heating and a preheating zone, means for supplying heat to said heating zone, a muffle of refractory material within said preheating zone, means for passing wares through said preheating and heating zones, the walls of said muffle being converged toward the end adjacent the heating zone.

2. In a tunnel kiln, a heating and a preheating zone, means for supplying heat to said heating zone, a muffle of refractory material within said preheating zone, said preheating zone being enlarged adjacent the inner entrance to said muffle, and means for passing wares through said preheating and heating zones.

3. In a tunnel kiln, a heating and a preheating zone, means for supplying heat to said heating zone, a muffle of refractory material within said preheating zone, means for maintaining a current of heated gases from said heating zone and out through said preheating zone, the top of said muffle being removable adjacent the exit for the heated gases whereby a variable current of heated gases may be passed directly through the muffle, and means for passing wares through said preheating and heating zones.

4. A tunnel kiln for burning ceramic wares consisting of a preheating zone, a heating zone, and a cooling zone, means for circulating hot combustion gases about the wares in the heating zone, said preheating zone being provided with a muffle completely shutting off the hot gases from the wares so as to effect more gradual heating thereof.

5. In the combination as defined in claim 4, said preheating zone being enlarged adjacent the inner end of the muffle.

6. A tunnel kiln for burning ceramic wares consisting of a preheating zone, a heating zone, and a cooling zone, means for circulating hot combustion gases about the wares in the heating zone, said preheating zone being provided with means for completely enclosing the wares in their passage therethrough to prevent the direct projection of hot gases thereon.

In testimony whereof I affix my signature.

TAINE G. McDOUGAL.